US012526493B2

(12) United States Patent
Cui et al.

(10) Patent No.: US 12,526,493 B2
(45) Date of Patent: Jan. 13, 2026

(54) AUTO EXPOSURE CONTROL SYSTEM AND IMAGE CORRECTION METHOD

(71) Applicant: NANOVISION TECHNOLOGY (BEIJING) CO., LTD, Beijing (CN)

(72) Inventors: Zhili Cui, Beijing (CN); Yunxiang Li, Beijing (CN); Youwei Zhang, Beijing (CN); Qing Wei, Beijing (CN)

(73) Assignee: NANOVISION TECHNOLOGY (BEIJING) CO., LTD, Beijing (CN)

( * ) Notice: Subject to any disclaimer, the term of this patent is extended or adjusted under 35 U.S.C. 154(b) by 536 days.

(21) Appl. No.: 18/046,920

(22) Filed: Oct. 15, 2022

(65) Prior Publication Data

US 2023/0068259 A1 Mar. 2, 2023

Related U.S. Application Data

(63) Continuation of application No. PCT/CN2020/119674, filed on Sep. 30, 2020.

(30) Foreign Application Priority Data

Apr. 16, 2020 (CN) .......................... 202010301589.4

(51) Int. Cl.
 *H04N 23/30* (2023.01)
 *H04N 23/73* (2023.01)
(52) U.S. Cl.
 CPC ............. *H04N 23/30* (2023.01); *H04N 23/73* (2023.01)

(58) Field of Classification Search
 CPC ....... A61B 6/4007; A61B 6/582; A61B 6/542; A61B 6/545
 See application file for complete search history.

(56) References Cited

U.S. PATENT DOCUMENTS

2013/0126742 A1* 5/2013 Hayun ................ G01T 1/20184
250/366

FOREIGN PATENT DOCUMENTS

| CN | 102599923 A | * | 7/2012 | |
| CN | 106383338 A | * | 2/2017 | ............... G01S 7/28 |
| CN | 109875587 A | * | 6/2019 | |

* cited by examiner

*Primary Examiner* — Edwin C Gunberg
*Assistant Examiner* — Richard O Toohey
(74) *Attorney, Agent, or Firm* — George Guosheng Wang; Upstream Research and Patent LLC

(57) ABSTRACT

Disclosed are an auto exposure control system and an image calibration method. The system comprises a main control unit and a plurality of auto exposure units, wherein the main control unit is connected to each of the auto exposure units; and the auto exposure units are in cascading connection. According to the system, detection of each X-ray source is realized by means of auto exposure units, such that an energy accumulation value and a KV level of X-rays are obtained; and when the energy accumulation value of X-rays reaches an energy threshold value, an auto exposure control signal is sent to a main control unit, such that the main control unit adjusts an exposure time sequence according to the auto exposure control signal, the aim of auto exposure control is achieved.

10 Claims, 10 Drawing Sheets

AUTO EXPOSURE CONTROL SYSTEM AND IMAGE CORRECTION METHOD

BACKGROUND

Technical Field

The present disclosure relates to an auto exposure control system, further to a corresponding image calibration method, and belong to the technical field of radiation imaging.

Related Art

For a multi-source static CT system, due to the difference in individual performance of X-ray sources, there will be some difference in KV, mA and ms of X-rays actually outputted by each X-ray source after the same exposure conditions are set for each X-ray source (such as X-ray tube voltage and current, and exposure time, abbreviated to KV, mA and ms). The difference in KV of X-rays belongs to a difference in an energy level, thus there will be deviation for a calculated CT value (a pixel of the image finally presented by a device is represented by the CT value), while the difference in mA and ms of X-rays may cause a difference in a signal-to-noise ratio, and therefore, calculation of the CT value will be further affected.

Auto exposure control of X-ray sources is usually realized by using an auto exposure control (AEC) detector and a high voltage generator on line. X-rays are emitted when an exposure signal (Spot signal) is received by the high voltage generator. At the same time, the auto exposure control detector performs energy integration on the X-rays and outputs an auto exposure control signal. In general, the auto exposure control signal is a ramp signal. When the auto exposure control signal is higher than a threshold voltage set by a threshold comparator provided inside the high voltage generator, the high voltage generator acquires an output signal of the threshold comparator and shuts off the output of the X-rays, so that the output energy of the X-rays can be controlled.

However, the auto exposure control described above is only for a single radiation source and is not applicable to a CT system with a plurality of radiation sources. Therefore, there is a need to design an auto exposure control system for obtaining a KV value of actual X-rays and controlling the exposure time of the X-rays such that the energy of the X-rays of each projection exposure of the plurality of X-ray sources tends to be uniform.

SUMMARY

A significant technical problem to be solved by the present disclosure is to provide an auto exposure control system.

Another technical problem to be solved by the present disclosure is to provide an image calibration method.

To achieve the above objective, the following technical solutions are used in the present disclosure:

According to a first aspect of an embodiment of the present disclosure, provided is an auto exposure control system, including a main control unit and a plurality of auto exposure units, the main control unit being connected to each of the auto exposure units, the auto exposure units being in cascading connection, each of the auto exposure units is installed at an outlet of a corresponding X-ray source, each of the auto exposure units being configured to receive an exposure signal sent by the main control unit to detect the corresponding X-ray source and obtain a KV level of X-rays outputted by the X-ray source, and at the same time determine whether to send an auto exposure control signal to the main control unit according to a preset condition, and the main control unit adjusting an exposure time sequence according to receiving the auto exposure control signal to achieve an aim of auto exposure control.

Preferably, the preset condition is: when the auto exposure unit detects the X-ray source, whether an obtained energy accumulation value of the X-rays reaches a preset energy threshold of the X-rays outputted by the X-ray source.

Preferably, the main control unit adopts a time sequence control panel containing a main controller and a first transceiver, wherein the main controller is connected to the first transceiver, and the first transceiver is connected to each of the auto exposure units via a high-speed real-time serial bus.

Preferably, each of the auto exposure units has a unique ID, and the unique ID of each of the auto exposure units is consistent with an ID of the corresponding X-ray source.

Preferably, all the auto exposure units are in cascading connection via a high-speed real-time serial bus to exchange operation parameters and detection results.

Preferably, each of the auto exposure units includes an auto exposure control module and a processing module, wherein the auto exposure control module is connected to an output end of the main control unit on the one hand and an input end of the processing module on the other hand, and an output end of the processing module is connected to an input end of the main control unit.

Preferably, the auto exposure control module includes a first X-ray probe, a second X-ray probe, a first integration circuit, a second integration circuit and a comparison circuit, wherein an output end of the first X-ray probe and the processing module are separately connected to an input end of the first integration circuit, an output end of the second X-ray probe and the processing module are separately connected to an input end of the second integration circuit, an output end of the first integration circuit is separately connected to an input end of the comparison circuit and the processing module, and the input end and an output end of the comparison circuit and an output end of the second integration circuit are separately connected to the processing module.

Preferably, the auto exposure control module includes a first X-ray probe, a second X-ray probe, a first integration circuit, a second integration circuit and a comparison circuit, wherein an output end of the first X-ray probe and the processing module are separately connected to an input end of the first integration circuit, an output end of the second X-ray probe and the processing module are separately connected to an input end of the second integration circuit, an output end of the second integration circuit is separately connected to an input end of the comparison circuit and the processing module, and the input end and an output end of the comparison circuit and an output end of the first integration circuit are separately connected to the processing module.

Preferably, the auto exposure control module includes a first X-ray probe, a second X-ray probe, a third X-ray probe, a first integration circuit, a second integration circuit, a third integration circuit, a first subtraction circuit, a second subtraction circuit and a comparison circuit, wherein an output end of the first X-ray probe and the processing module are separately connected to an input end of the first integration circuit, an output end of the third X-ray probe and the processing module are separately connected to an input end of the third integration circuit, an output end of the second X-ray probe and the processing module are separately connected to an input end of the second integration circuit, an output end of the first integration circuit is separately connected to an input end of the first subtraction circuit and the processing module, an output end of the third integration circuit is separately connected to the input end of the first subtraction circuit and an input end of the second subtraction circuit, an output end of the second integration circuit is connected to the input end of the second subtraction circuit, an output end of the first subtraction circuit is connected to an input end of the comparing circuit, and the input end and an output end of the comparison circuit, the output end of the first subtraction circuit and an output end of the second subtraction circuit are separately connected to the processing module.

Preferably, the auto exposure control module includes a first X-ray probe, a second X-ray probe, a third X-ray probe, a first integration circuit, a second integration circuit, a third integration circuit, a first subtraction circuit, a second subtraction circuit and a comparison circuit, wherein an output end of the first X-ray probe and the processing module are separately connected to an input end of the first integration circuit, an output end of the third X-ray probe and the processing module are separately connected to an input end of the third integration circuit, an output end of the second X-ray probe and the processing module are separately connected to an input end of the second integration circuit, an output end of the first integration circuit is separately connected to an input end of the first subtraction circuit and the processing module, an output end of the third integration circuit is separately connected to the input end of the first subtraction circuit and an input end of the second subtraction circuit, an output end of the second integration circuit is connected to the input end of the second subtraction circuit, an output end of the second subtraction circuit is connected to an input end of the comparing circuit, and the input end and an output end of the comparing circuit, an output end of the first subtraction circuit and the output end of the second subtraction circuit are separately connected to the processing module.

Preferably, the processing module includes a digital-to-analogue conversion circuit, a first analogue-to-digital conversion circuit, a second analogue-to-digital conversion circuit, a processor and a second transceiver, wherein an input end of the digital-to-analogue conversion circuit is connected to the processor, an output end of the digital-to-analogue conversion circuit is connected to the input end of the comparison circuit, an input end of the first analogue-to-digital conversion circuit is connected to the output end of the first integration circuit, an input end of the second analogue-to-digital conversion circuit is connected to the output end of the second integration circuit, the output end of the comparison circuit and output ends of the first analogue-to-digital conversion circuit and the second analogue-to-digital conversion circuit are connected to the processor, the processor is connected to the second transceiver, and the second transceiver is connected to the main control unit via a high-speed real-time serial bus.

Preferably, the processing module includes a digital-to-analogue conversion circuit, a first analogue-to-digital conversion circuit, a second analogue-to-digital conversion circuit, a processor and a second transceiver, wherein an input end of the digital-to-analogue conversion circuit is connected to the processor, an output end of the digital-to-analogue conversion circuit is connected to the input end of the comparison circuit, an input end of the first analogue-to-digital conversion circuit is connected to the output end of the first subtraction circuit, an input end of the second analogue-to-digital conversion circuit is connected to the output end of the second subtraction circuit, the output end of the comparison circuit and output ends of the first analogue-to-digital conversion circuit and the second analogue-to-digital conversion circuit are connected to the processor, the processor is connected to the second transceiver, and the second transceiver is connected to the main control unit via a high-speed real-time serial bus.

According to a second aspect of an embodiment of the present disclosure, provided is an image calibration method, including the following steps:

step S1: obtaining an initial reference pixel value and a current image reference pixel value of each X-ray source;

step S2: calibrating an obtained current image of each X-ray source according to the initial reference pixel value and the current image reference pixel value of each of the X-ray sources when an image is normally acquired;

step S3: obtaining KV calibration template coefficients of X-rays outputted by each X-ray source; and step S4: performing KV calibration on the image of step S2 according to the KV calibration template coefficients of the X-rays.

Preferably, step S1 includes the following sub-steps:

step S11: obtaining a dark field template and an air calibration template for each of the X-ray sources, respectively;

step S12: obtaining the initial reference pixel value for each of the X-ray sources according to the air calibration template for each of the X-ray sources; and step S13: obtaining an actual projection image corresponding to each of the X-ray sources, and obtaining the current image reference pixel value of each of the X-ray sources according to the actual projection image corresponding to each of the X-ray sources.

Preferably, in a case that the X-ray source does not emit X-rays, a mean value of gray values of pixels of a dark field image of each of the X-ray sources is obtained as the dark field template of each of the X-ray sources.

Preferably, when it is ensured that there is no object in a projection area, after averaging the obtained gray values of the pixels of a plurality of projection images corresponding to each of the X-ray sources, separately subtracting the dark field template of the corresponding X-ray source as the air calibration template of each of the X-ray sources.

Preferably, for the air calibration template of each of the X-ray sources, by comparing a mean value of all pixels of a column at a distance of a plurality of pixels to the left with a mean value of a column at a distance of a plurality of pixels to the right, a larger mean value of pixels is taken as the initial reference pixel value of each of the X-ray sources.

Preferably, for the actual projection image corresponding to each of the X-ray sources, by comparing a mean value of all pixels of a column at a distance of a plurality of pixels to the left with a mean value of the column at a distance of a plurality of pixels to the right, a larger mean value of pixels is taken as the current image reference pixel value of each of the X-ray sources.

Preferably, when an image is normally acquired, each pixel of an image obtained after each of the X-ray sources is exposed is multiplied by a ratio of the initial reference pixel value to the current image reference pixel value of the corresponding X-ray source to obtain a group of images with consistent gray values throughout the images.

Preferably, the KV level of the X-rays is a ratio of a first energy accumulation value to a second energy accumulation value of the X-rays.

Preferably, the KV level of the X-rays is normalized to obtain the KV calibration template coefficients.

Preferably, when performing KV calibration on an image, the ratio of the pixel gray value of the image obtained after each of the X-ray sources is exposed to the pixel gray value of the air calibration template of the corresponding X-ray source is divided by the corresponding KV calibration template coefficient.

According to the auto exposure control system and the image calibration method provided by the present disclosure, detection of each of the X-ray sources is realized by setting the auto exposure units with the same number as the X-ray sources, such that an energy accumulation value and a KV level of X-rays are obtained. When the energy accumulation value of X-rays reaches an energy threshold, an auto exposure control signal is sent to the main control unit, such that the main control unit adjusts an exposure time sequence according to the auto exposure control signal, the aim of auto exposure control is achieved, and energy outputted by means of single exposure of X-rays remains relatively fixed, thereby optimizing the problem of an unstable output of X-rays, and solving the problem of inconsistent X-ray outputs between various ray sources in an X-ray image system with a plurality of ray sources.

DETAILED DESCRIPTION

The technical solutions of the present disclosure are further described in detail below with reference to the accompanying drawings and embodiments.

Figure 1:
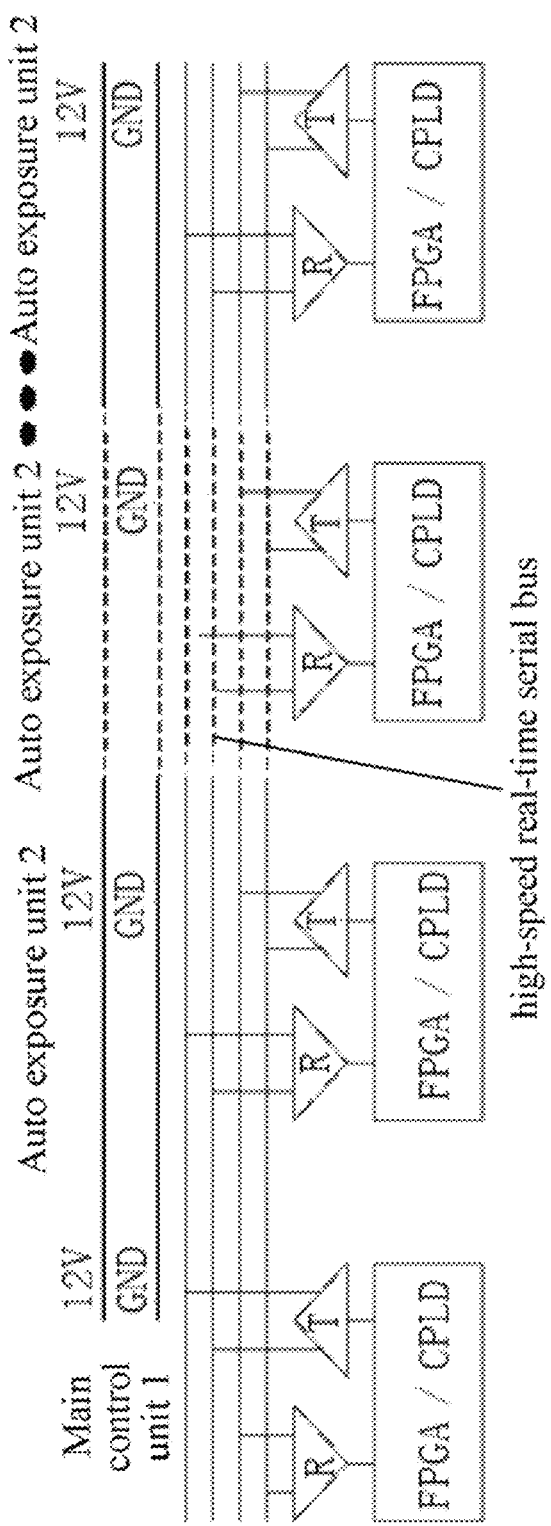
FIG. 1 is a topological structure diagram of an auto exposure control system provided by the present disclosure.

In order to solve the problem of inconsistent X-ray output energy of a plurality of X-ray sources in a CT system with a plurality of X-ray sources, as shown in FIG. 1, the present disclosure provides an auto exposure control system including a main control unit 1 and a plurality of auto exposure units 2. The main control unit 1 is connected to each of the auto exposure units 2. The auto exposure units 2 are in cascading connection. Each auto exposure unit 2 is installed at an outlet of a corresponding X-ray source.

Each of the auto exposure unit 2 is configured to receive an exposure signal sent by the main control unit 1 to detect the corresponding X-ray source to obtain a KV level of X-rays outputted by the X-ray source and send same to the main control unit 1, and at the same time determine whether to send an auto exposure control signal to the main control unit 1 according to a preset condition.

The main control unit 1 adjusts an exposure time sequence according to the received auto exposure control signal to achieve an aim of auto exposure control.

The preset condition is: when the auto exposure unit 2 detects the X-ray source, whether an obtained energy accumulation value of the X-rays reaches a preset energy threshold of the X-rays outputted by the X-ray source. It is to be noted that the energy accumulation value and energy threshold of X-rays emitted by each X-ray source are presented in the form of voltage. The set energy threshold of the X-rays outputted by each X-ray source is the same. The energy threshold is set according to the X-ray energy required for each image acquisition and the level of ensuring that the presented image tends to be suitable. In addition, the main control unit 1 sets an energy threshold of the X-rays outputted by the X-ray source corresponding to each auto exposure unit 2 to control the energy level of the X-rays outputted by the designated X-ray source for auto exposure.

When the auto exposure unit 2 detects an X-ray source, the energy accumulation value of X-rays obtained is an energy accumulation value at which X-rays are emitted from the X-ray source.

The main control unit 1 adopts a time sequence control panel containing a main controller, a field-programmable gate array (FPGA) and a first transceiver. The main controller of the time sequence control panel is connected to the first transceiver. The first transceiver is connected to each of the auto exposure units 2 via a high-speed real-time serial bus. The main control unit 1 may generate an exposure time sequence. After sending a preparation signal to the high voltage generator, the main control unit 1 designates to send an exposure signal to one or more auto exposure units 2 to turn on the auto exposure units 2. Not only is the detection of a designated X-ray source is achieved, but also the designation of one or more X-ray sources to perform an exposure action is achieved. The main controller includes, but is not limited to, a field-programmable gate array (FPGA) or a complex programmable logic device (CPLD).

When one or more auto exposure units 2 detect a corresponding X-ray source, if the energy accumulation value of the X-rays obtained by each of the auto exposure units 2 reaches a preset energy threshold of the X-rays outputted by the X-ray source, an auto exposure control signal is sent to the main control unit 1, so that the main control unit 1 adjusts the exposure time sequence according to the auto exposure control signal to achieve the aim of auto exposure control. Specifically, the main control unit 1 adjusts the width of the exposure signal sent to the corresponding auto exposure unit 2 according to the auto exposure control signal to stop the exposure action of the corresponding X-ray source. Since the auto exposure control signal is at a high level, when the main control unit 1 receives the auto exposure control signal sent by one or more auto exposure units 2, the exposure signal sent to the corresponding auto exposure unit 2 needs to be adjusted to a low level, so that the corresponding auto exposure unit 2 stops the detection of the X-ray source. At this moment, the main control unit 1 also controls a high voltage generator to stop providing high voltage signals to the X-ray source to switch off the X-ray output of the corresponding X-ray source. Therefore, under the same energy threshold condition, by controlling the X-ray exposure time of each X-ray source, the energy of X-rays of each projection exposure of a plurality of X-ray sources tends to be consistent. That is, the energy outputted by means of single exposure of X-rays remains relatively fixed to optimize the problem of unstable X-ray outputs.

The main control unit 1 is also configured to provide a cascade power supply for each of the auto exposure units 2, and meanwhile is responsible for the control over the high-speed real-time serial bus. The high-speed real-time serial bus includes a power supply and a bus signal. Furthermore, the high-speed real-time serial bus has a pair of power sources, a pair of grounded and two-pass differential half-duplex buses to form a full-duplex bus via external interfaces. Also, the four sets of power and bus signals of the high-speed real-time serial bus each use a pair of twisted pairs. In addition, the high-speed real-time serial bus defines an information update period according to the needs of the system, and defines a basic baud rate according to the number of basic frame format data bits and the number of reliability margin bits. For example, if the information update period is 1 us, the basic frame format data bits are 20 bits, and the reliability margin is 5 bits according to the needs of the system, then the basic baud rate is (20+5)/1 us, i.e. 25 MBps.

The main control unit 1 not only provides a cascade power supply for each of the auto exposure units 2 through a high-speed real-time serial bus, but also sends an exposure signal for X-ray source exposure and an X-ray energy threshold for comparison to a designated auto exposure unit 2 through the high-speed real-time serial bus. On the other hand, the auto exposure unit 2 sends the auto exposure control signal and the KV level of the X-rays outputted from the X-ray source to the main control unit 1 through the high-speed real-time serial bus.

Each auto exposure unit 2 has a unique ID for defining its address. The ID is identified by a source ID and a focus ID. The ID of each auto exposure unit 2 is identical to the ID of the corresponding X-ray source to identify that the auto exposure unit 2 and the X-ray source assembled together have the same ID. Since the source ID and the focus ID of different X-ray sources are different, the main control unit 1 may broadcast an exposure time sequence, i.e., an exposure signal, the source ID and the focus ID information, to each auto exposure unit 2 via a path of differential half-duplex bus to designate one or more X-ray sources to perform an exposure action. Since in a default state, the main control unit 1 and each of the auto exposure units 2 are in a receiving state, when one or more designated auto exposure units 2 operate, each of the auto exposure units 2 switches to a sending mode to send an auto exposure control signal and the KV level of the X-rays outputted by the X-ray source to the main control unit 1, so that the main control unit 1 adjusts the exposure time sequence of the X-ray source according to the auto exposure control signal fed back by the auto exposure unit 2 corresponding to the designated X-ray source to achieve the aim of auto exposure control.

Figure 2:
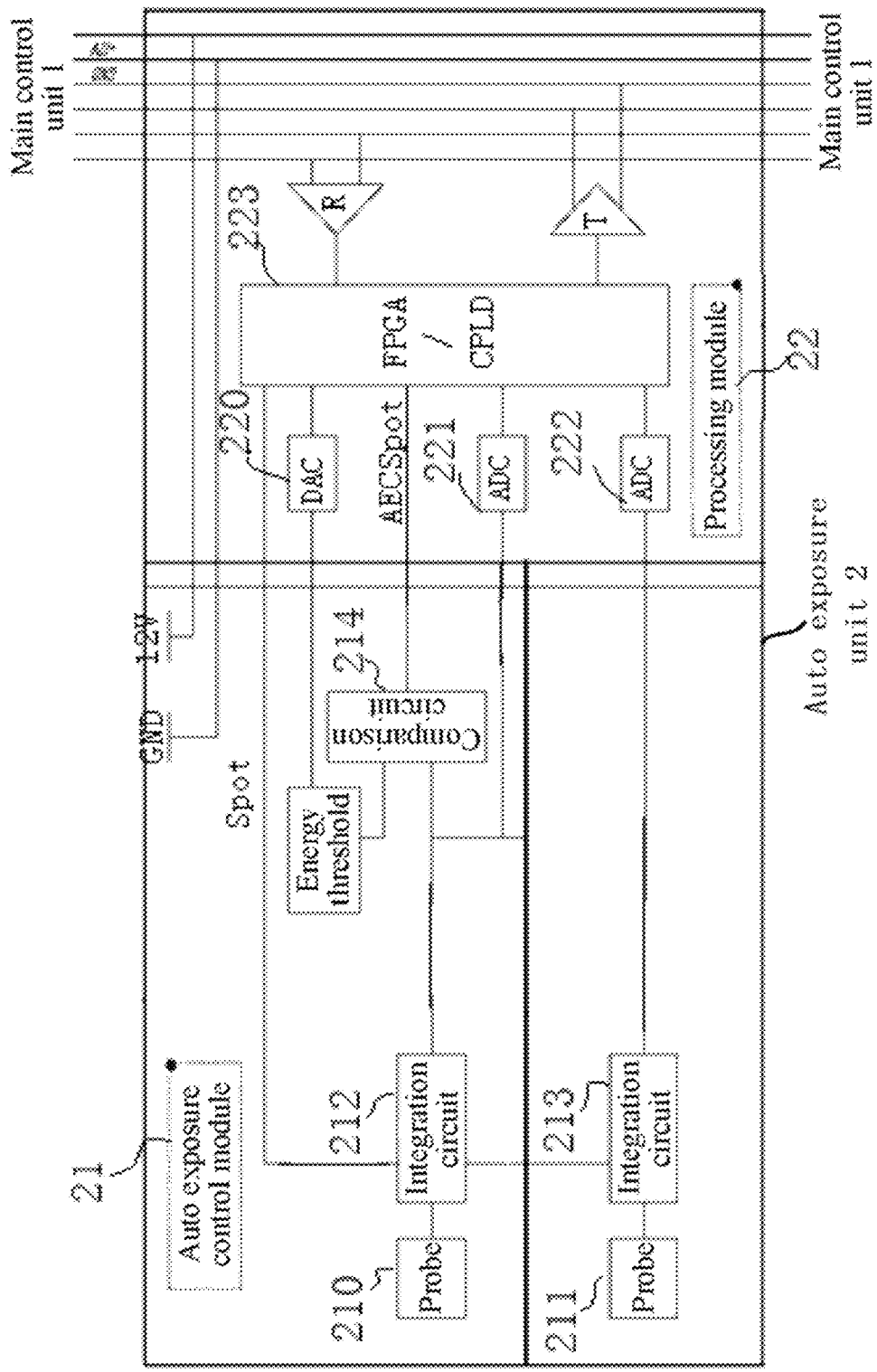
FIG. 2 is a schematic structural diagram 1 of an auto exposure control module in the auto exposure control system provided by the present disclosure.
Figure 3:
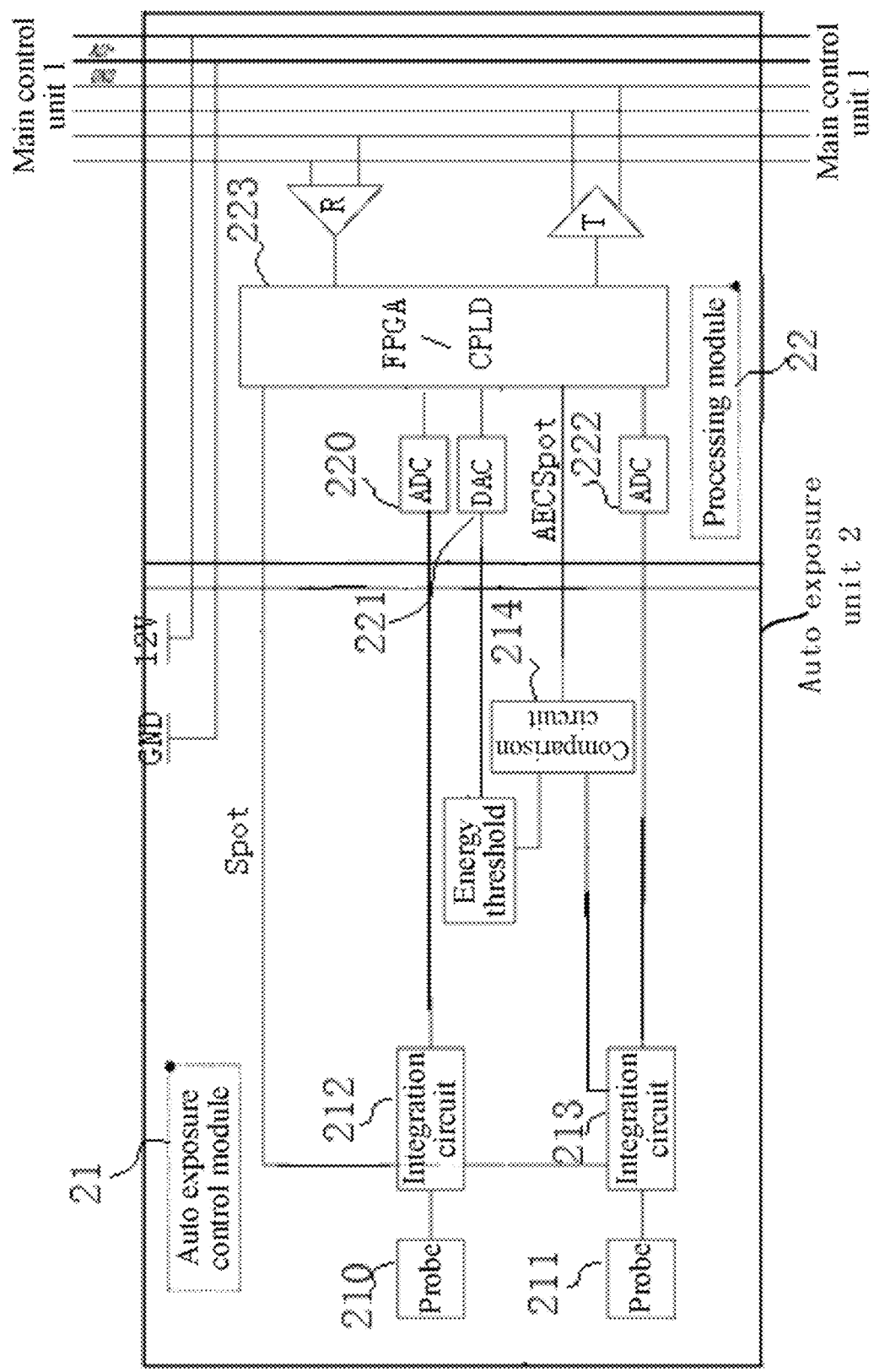
FIG. 3 is a schematic structural diagram 2 of an auto exposure control module in the auto exposure control system provided by the present disclosure.
Figure 4:
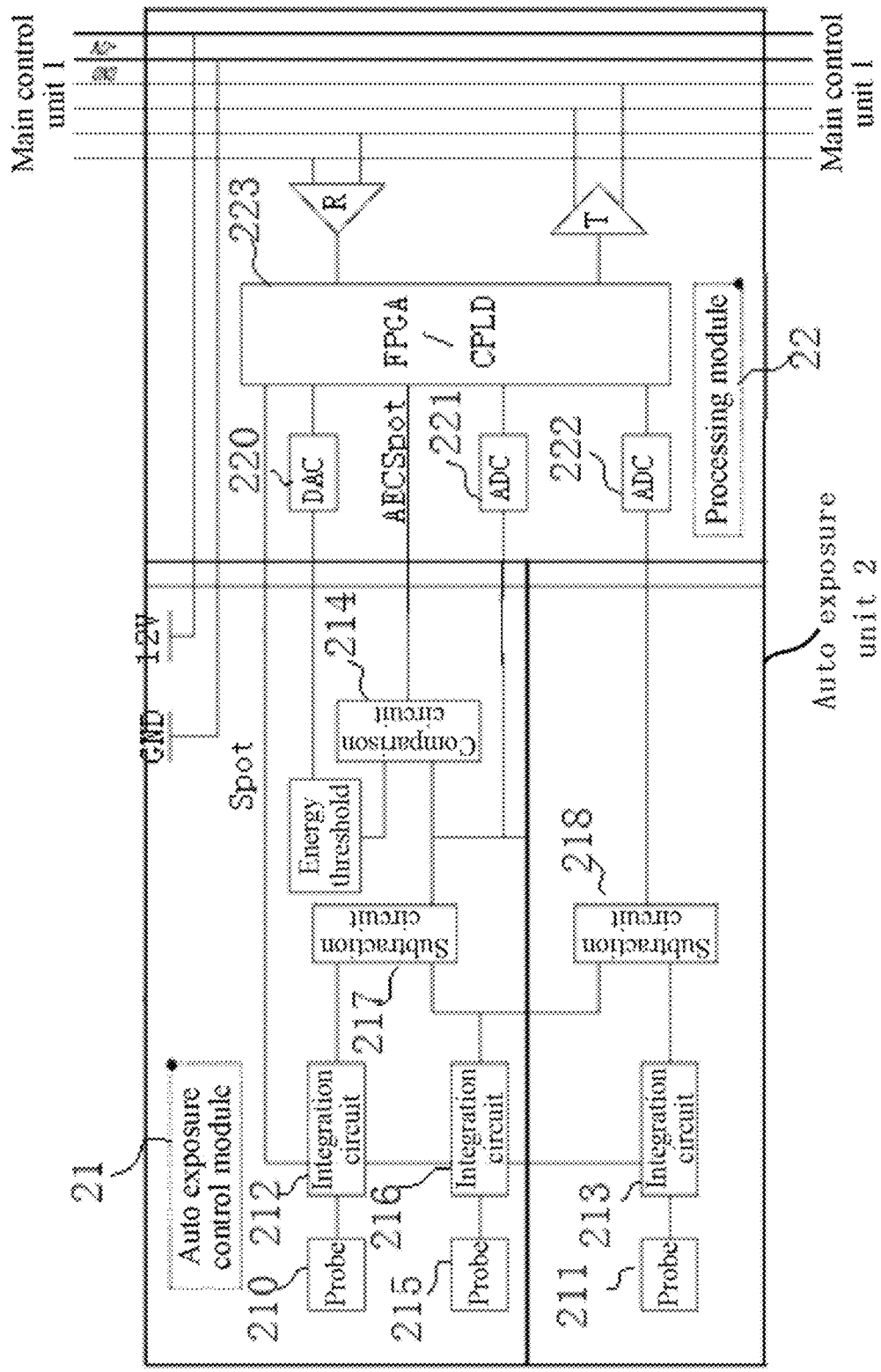
FIG. 4 is a schematic structural diagram 1 of another auto exposure control module in the auto exposure control system provided by the present disclosure.

All the auto exposure units 2 are in cascading connection via the high-speed real-time serial bus to exchange operation parameters and detection results and to facilitate reliability and engineering of the system. Each of the auto exposure units 2 is installed at an outlet of the X-ray source, and there is no X-ray scattering image caused by other objects to be measured, so that the detection result is more accurate. As shown in FIG. 2 to FIG. 4, each of the auto exposure units 2 includes an auto exposure control module 21 and a processing module 22. The auto exposure control module 21 is connected to an output end of the main control unit 1 on the one hand, and is connected to an input end of the processing module 22 on the other hand. An output end of the processing module 22 is connected to an input end of the main control unit 1.

After sending a preparation signal to the high voltage generator, the main control unit 1 designates to send an exposure signal to the auto exposure control module 21 of one or more auto exposure units 2 to turn on the auto exposure control module 21 to realize the detection of the designated X-ray source, and outputs the energy accumulation value of the X-rays obtained in real time to the processing module 22 to obtain the KV level of the X-rays outputted by each X-ray source and send same to the main control unit 1. At the same time, if the energy accumulation value of the X-rays obtained when the auto exposure control module 21 detects the X-ray source reaches a preset energy threshold of the X-rays, an auto exposure control signal is sent to the main control unit 1 via the processing module 22, so that the main control unit 1 adjusts the exposure time sequence according to the auto exposure control signal to achieve the aim of auto exposure control.

As shown in FIG. 2, in an embodiment of the present disclosure, the auto exposure control module 21 includes a first X-ray probe 210, a second X-ray probe 211, a first integration circuit 212, a second integration circuit 213 and a comparison circuit 214. Each part of the auto exposure control module 21 may have the following two connection relationships. The first connection relationship is as follows. An output end of the first X-ray probe 210 and the processing module 22 are separately connected to an input end of the first integration circuit 212. An output end of the second X-ray probe 211 and the processing module 22 are separately connected to an input end of the second integration circuit 213. An output end of the first integration circuit 212 is separately connected to an input end of the comparison circuit 214 and the processing module 22. The input and an output end of the comparison circuit 214 and an output end of the second integration circuit 213 are separately connected to the processing module 22.

As shown in FIG. 3, the second connection relationship of each part of the auto exposure control module 21 is as follows. An output end of the first X-ray probe 210 and the processing module 22 are separately connected to an input end of the first integration circuit 212. An output end of the second X-ray probe 211 and the processing module 22 are separately connected to an input end of the second integration circuit 213. An output end of the second integration circuit 213 is separately connected to an input end of the comparison circuit 214 and the processing module 22. The input and an output end of the comparison circuit 214 and an output end of the first integration circuit 212 are separately connected to the processing module 22.

Operation principles of the two connection relationships of the auto exposure control module 21 of this embodiment are the same, except that in the process of realizing auto exposure control over the X-ray source, the first energy accumulation value $I_0$ of the X-rays obtained by the first integration circuit 212 or the second energy accumulation value I of the X-rays obtained by the second integration circuit 212 may be selected to be outputted to the comparison circuit 214 to determine whether the first energy accumulation value of the X-rays or the second energy accumulation value I of the X-rays reaches a preset energy threshold of the X-rays to determine whether to send an auto exposure control signal to the main control unit 1, so that the main control unit adjusts the exposure time sequence to achieve the aim of auto exposure control. The operation principle of the auto exposure control module 21 provided in this embodiment will be described in detail with reference to an example in which the first energy accumulation value $I_0$ of X-rays obtained by the first integration circuit 212 is outputted to the comparison circuit 214.

As shown in FIG. 2, an energy threshold of X-rays outputted by an X-ray source corresponding to each auto exposure unit 2 is set by a main control unit 1. The energy threshold is transmitted to the comparison circuit 214 via the processing module 22. When a high voltage generator is ready to emit a high voltage to an X-ray tube, the main control unit 1 sends an exposure signal (a Spot signal as shown in FIG. 2) to the first integration circuit 212 and the second integration circuit 213 to start the first integration circuit 212 and the second integration circuit 213. The first X-ray probe 210 and the second X-ray probe 211 start to detect X-rays emitted from the X-ray source to correspondingly continuously obtain a first X-ray current and a second X-ray current, and correspondingly output the first X-ray current and the second X-ray current to the first integration circuit 212 and the second integration circuit 213 to realize energy accumulation of X-rays. The first energy accumulation value $I_0$ of the X-rays obtained by the first integration circuit 212 and the second energy accumulation value I of the X-rays obtained by the second integration circuit 212 are separately outputted to the processing module 22 to obtain a KV level of the output X-rays of the designated X-ray source.

The first energy accumulation value $I_0$ of the X-rays obtained by the first integration circuit 212 is also outputted to the comparison circuit 214. The comparison circuit 214 compares the first energy accumulation value $I_0$ of the X-rays with the energy threshold of the X-rays, and if the first energy accumulation value of the X-rays reaches the preset energy threshold of the X-rays, an auto exposure control signal (such as an AEC Spot signal as shown in FIG. 2) is sent to the main control unit 1 via the processing module 22, so that the main control unit 1 controls the high voltage generator to stop providing a high voltage to the X-ray source to shut off the X-ray output of the corresponding X-ray source. At the same time, the main control unit 1 also adjusts the width of the exposure signal sent to the first integration circuit 212 and the second integration circuit 213 according to the auto exposure control signal, namely, turning off the exposure signal sent to the first integration circuit 212 and the second integration circuit 213, so that the first integration circuit 212 and the second integration circuit 213 remain in a clear state, thereby stopping the exposure action of the corresponding X-ray source.

It is to be noted that different X-ray intensities (energy accumulation values of X-rays) are detected based on varying thickness of the absorbing material between the X-ray source and the probe, since the transmission of X-rays emitted by the X-ray source in the substance follows an attenuation law. In an embodiment of the present disclosure, the first energy accumulation value $I_0$ and the second energy accumulation value I of the X-rays are obtained by setting different thicknesses of the absorption material from the X-ray source to the first X-ray probe 210 and the second X-ray probe 211, separately. When the auto exposure control module 21 of this embodiment detects an X-ray source, the first X-ray probe 210 and the second X-ray probe 211 also have a background current when the X-ray source does not emit X-rays. Since the background current is relatively small, the influence on the first energy accumulation value $I_0$ and the second energy accumulation value I of the X-rays finally obtained is not great, and thus the background detection in the case of no X-ray output can be ignored.

As shown in FIG. 4, in another embodiment of the present disclosure, the auto exposure control module 21 includes a first X-ray probe 210, a second X-ray probe 211, a third X-ray probe 215, a first integration circuit 212, a second integration circuit 213, a third integration circuit 216, a first subtraction circuit 217, a second subtraction circuit 218 and a comparison circuit 214. Each part of the auto exposure control module 21 may have the following two connection relationships.

The first connection relationship is as follows. An output end of the first X-ray probe 210 and the processing module 22 are separately connected to an input end of the first integration circuit 212. An output end of the third X-ray probe 215 and the processing module 22 are separately connected to an input end of the third integration circuit 216. An output end of the second X-ray probe 211 and the processing module 22 are separately connected to an input end of the second integration circuit 213. An output end of the first integration circuit 212 is separately connected to an input end of the first subtraction circuit 217 and the processing module 22. An output end of the third integration circuit 216 is respectively connected to the input end of the first subtraction circuit 217 and an input end of the second subtraction circuit 218. An output end of the second integration circuit 213 is connected to the input end of the second subtraction circuit 218. An output end of the first subtraction circuit 217 is connected to an input end of the comparison circuit 214. The input end and an output end of the comparison circuit 214, the output end of the first subtraction circuit 217 and an output end of the second subtraction circuit 218 are separately connected to the processing module 22.

Figure 5:
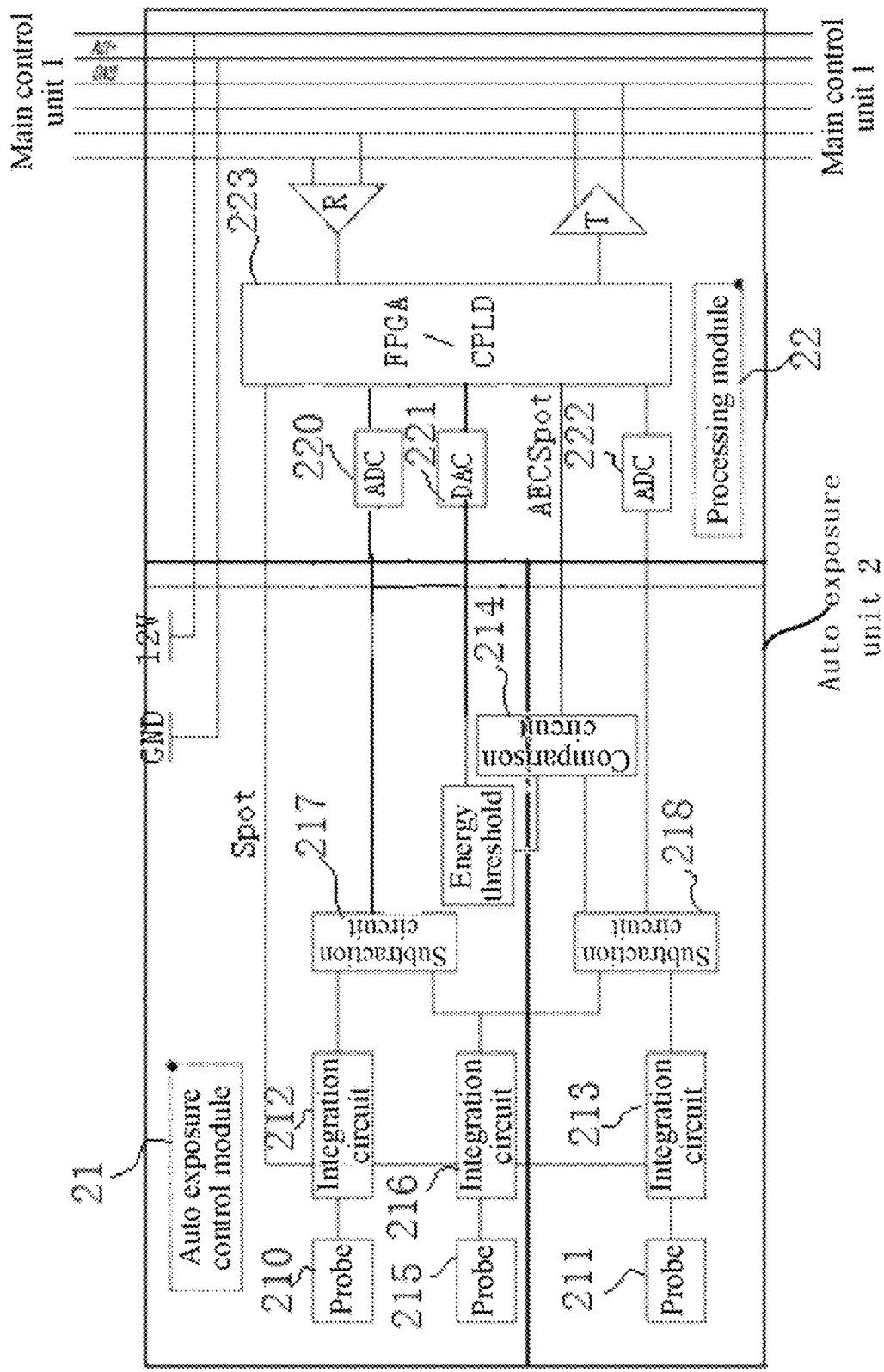
FIG. 5 is a schematic structural diagram 2 of another auto exposure control module in the auto exposure control system provided by the present disclosure.

As shown in FIG. 5, the second connection relationship of each part of the auto exposure control module 21 is as follows. An output end of the first X-ray probe 210 and the processing module 22 are separately connected to an input end of the first integration circuit 212. An output end of the third X-ray probe 215 and the processing module 22 are separately connected to an input end of the third integration circuit 216. An output end of the second X-ray probe 211 and the processing module 22 are separately connected to an input end of the second integration circuit 213. An output end of the first integration circuit 212 is separately connected to an input end of the first subtraction circuit 217 and the processing module 22. An output end of the third integration circuit 216 is separately connected to the input end of the first subtraction circuit 217 and an input end of the second subtraction circuit 218. An output end of the second integration circuit 213 is connected to the input end of the second subtraction circuit 218. An output end of the second subtraction circuit 218 is connected to an input end of the comparison circuit 214. The input end and an output end of the comparison circuit 214, an output end of the first subtraction circuit 217 and the output end of the second subtraction circuit 218 are separately connected to the processing module 22.

An operation principle of the auto exposure control module 21 of this embodiment is different from that of the auto exposure control module 21 of the above embodiment in that: when detecting the X-ray source, the auto exposure control module 21 of this embodiment takes into account that the first X-ray probe 210 and the second X-ray probe 211 also have a background current when the X-ray source does not emit X-rays. Therefore, the auto exposure control module 21 of this embodiment obtains a background current outputted when the X-ray source does not emit X-rays by performing complete light-shielding processing on the third X-ray probe 215, and outputs the background current to the third integration circuit 216 to obtain a background energy accumulation value K of the X-rays. The background energy accumulation value K is separately outputted to the first subtraction circuit 217 and the second subtraction circuit 218, so that the first subtraction circuit 217 subtracts the background energy accumulation value K from the received first energy accumulation value of the background energy containing the X-ray obtained by the first integration circuit 212 to obtain the first energy accumulation value $I_0$ of the X-ray. Similarly, the second subtraction circuit 218 subtracts the background energy accumulation value K from the received second energy accumulation value of the background energy containing X-rays obtained by the second integration circuit 213 to obtain a second energy accumulation value I of X-rays.

With reference to an example in which the first energy accumulation value $I_0$ of the X-rays obtained by the first subtraction circuit 217 is outputted to the comparison circuit 214, the comparison circuit 214 compares the received first energy accumulation value ° of the X-ray with the energy threshold of the X-ray, and if the first energy accumulation value of the X-rays reaches the preset energy threshold of the X-rays, an auto exposure control signal is sent to the main control unit 1 via the processing module 22, so that the main control unit 1 controls the high voltage generator to stop providing a high voltage to the X-ray source to shut off the X-ray output of the corresponding X-ray source. At the same time, the main control unit 1 also adjusts the width of the exposure signal sent to the first integration circuit 212 and the second integration circuit 213 according to the auto exposure control signal, namely, turning off the exposure signal sent to the first integration circuit 212 and the second integration circuit 213, so that the first integration circuit 212 and the second integration circuit 213 remain in a clear state, thereby stopping the exposure action of the corresponding X-ray source.

As shown in FIG. 2 to FIG. 5, the processing module 22 includes a digital-to-analogue conversion circuit 220, a first analogue-to-digital conversion circuit 221, a second analogue-to-digital conversion circuit 222, a processor 223 and a second transceiver. The processor 223 includes, but is not limited to, a field-programmable gate array (FPGA) and a complex programmable logic device (CPLD). The connection relationship between various parts of the processing module 2 is described below by taking the processor 223 adopting FPGA as an example.

According to the two structures of the auto exposure control module 21, each part of the processing module 22 has two connection relationships. As shown in FIG. 2 and FIG. 3, when the first auto exposure control module 21 is adopted, the connection relationship of various parts of the processing module 22 is as follows. An input end of the digital-to-analogue conversion circuit 220 is connected to the FPGA 223. An output end of the digital-to-analogue conversion circuit 220 is connected to the input end of the comparison circuit 214. An input end of the first analogue-to-digital conversion circuit 221 is connected to the output end of the first integration circuit 212 of the auto exposure control module 21. An input end of the second analogue-to-digital conversion circuit 222 is connected to the output end of the second integration circuit 212 of the auto exposure control module 21. The output end of the comparison circuit 214 and output ends of the first analogue-to-digital conversion circuit 221 and the second analogue-to-digital conversion circuit 222 are connected to the FPGA 223. The FPGA 223 is connected to the second transceiver. The second transceiver is connected to the first transceiver of the main control unit 1 via a high-speed real-time serial bus.

As shown in FIG. 4 and FIG. 5, when the second auto exposure control module 21 is adopted, the connection relationship of various parts of the processing module 22 is as follows. An input end of the digital-to-analogue conversion circuit 220 is connected to the FPGA 223. An output end of the digital-to-analogue conversion circuit 220 is connected to the input end of the comparison circuit 214. An input end of the first analogue-to-digital conversion circuit 221 is connected to the output end of the first subtraction circuit 217. An input end of the second analogue-to-digital conversion circuit 222 is connected to the output end of the second subtraction circuit 218. The output end of the comparison circuit 214 and output ends of the first analogue-to-digital conversion circuit 221 and the second analogue-to-digital conversion circuit 222 are connected to the FPGA 223. The FPGA 223 is connected to the second transceiver. The second transceiver is connected to the first transceiver of the main control unit 1 via a high-speed real-time serial bus.

An operation principle of the processing module 22 is as follows. An energy threshold of X-rays outputted by an X-ray source corresponding to each auto exposure unit 2 is set via the main control unit 1. The energy threshold is sent to the FPGA 223 via the second transceiver. The FPGA 223 sends the energy threshold to the digital-to-analogue conversion circuit 220 and converts same into an analogue voltage, and then sends same to the comparison circuit 214. The auto exposure control module 21 detects the X-ray source. The obtained first energy accumulation value c and second energy accumulation value I are converted into digital signals correspondingly via the first analogue-to-digital conversion circuit 221 and the second analogue-to-digital conversion circuit 222, and then sent to the FPGA 223. The FPGA 223 divides the first energy accumulation value $I_0$ and the second energy accumulation value I to obtain $I/I_0$, i.e. a KV level of the X-rays outputted of the X-ray source, and uploads same to the main control unit 1 via the second transceiver. The FPGA 223 is also configured to receive an auto exposure control signal and upload same to the main control unit 1 via the second transceiver, so that the main control unit 1 adjusts the exposure time sequence according to the auto exposure control signal to achieve the aim of auto exposure control.

In summary, according to the auto exposure control system provided by the present disclosure, detection of each of the X-ray sources is realized by setting the auto exposure units with the same number as the X-ray sources, such that an energy accumulation value and a KV level of X-rays are obtained. When the energy accumulation value of X-rays reaches an energy threshold, an auto exposure control signal is sent to the main control unit, such that the main control unit adjusts an exposure time sequence according to the auto exposure control signal, the aim of auto exposure control is achieved, and energy outputted by means of single exposure of X-rays remains relatively fixed, thereby optimizing the problem of an unstable output of X-rays, and solving the problem of inconsistent X-ray outputs between various ray sources in an X-ray image system with a plurality of ray sources.

Figure 6:
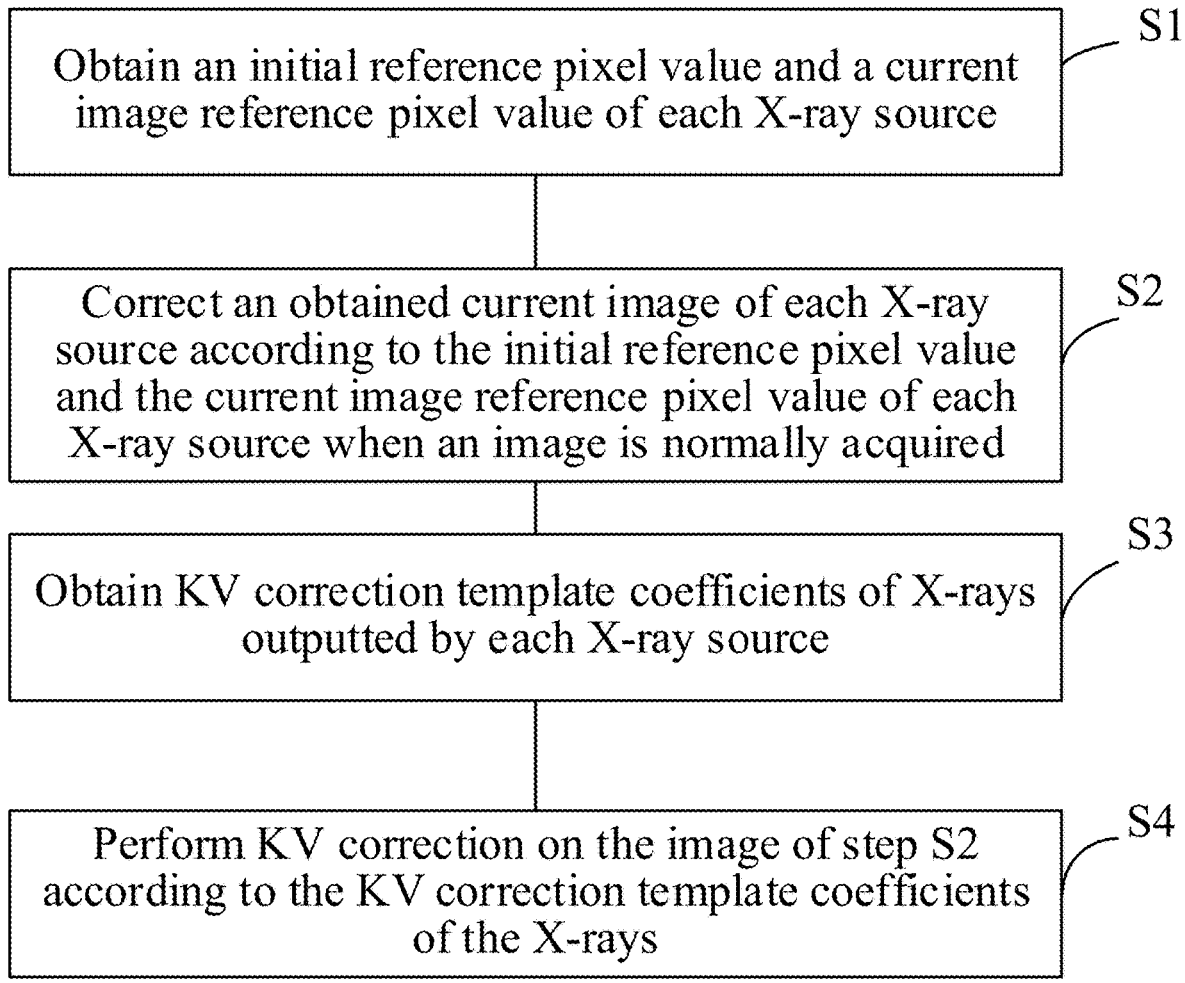
FIG. 6 is a flowchart of an image calibration method provided by the present disclosure.

Through the auto exposure control system, the problem of inconsistent X-ray output of a plurality of X-ray sources has been greatly ameliorated, and the energy output of X-rays is basically stable. However, there is still a small difference in the inconsistency of the energy output of a plurality of X-ray sources, and even with a plurality of exposures of a single X-ray source, the output energy is not completely consistent. The appearance is that the gray values of the images exposed by different X-ray sources or a plurality of exposure images of a single X-ray source have a certain difference, which is about 1%, and for 16-bit images, there is a difference of about 500. This difference may affect the uniformity of the image and thus the density resolution of the image after reconstruction. The present disclosure therefore also provides an image calibration method for further ameliorating the problem of inconsistent brightness of the resulting image after each X-ray source exposure. As shown in FIG. 6, the image calibration method includes the following steps:

Step S1: Obtain an initial reference pixel value and a current image reference pixel value of each X-ray source.

The step includes the following sub-steps:

Step S11: Obtain a dark field template and an air calibration template for each of the X-ray sources, respectively.

In a case that the X-ray source does not emit X-rays, a plurality of (such as >20) dark field images are respectively acquired for each X-ray source, and the gray values of the pixels of the plurality of dark field images of each X-ray source are averaged to obtain a mean value of the gray values of the pixels of the dark field images of each X-ray source, and stored as the dark field template of each X-ray source.

When it is ensured that there is no object in a projection area, the X-ray emission condition is set as a condition required by the application. A plurality of projection images (such as >20 images) of each X-ray source are obtained. The gray values of the pixels of the plurality of projection images corresponding to each of the X-ray sources are averaged to obtain a mean value of the gray values of the pixels of the projection images of each X-ray source. At this time, the mean value of the gray values of the pixels of the projection images of each X-ray source is respectively subtracted from the dark field template of the corresponding X-ray source, and then stored to serve as an air calibration template of each X-ray source.

Step S12: Obtain the initial reference pixel value for each of the X-ray sources according to the air calibration template for each of the X-ray sources.

For the air calibration template of each of the X-ray sources, by comparing a mean value of all pixels of a column at a distance of a plurality of (e.g. 10) pixels to the left with a mean value of a column at a distance of a plurality of (e.g. 10) pixels to the right, a larger mean value of pixels is taken as the initial reference pixel value of each of the X-ray sources.

Step S13: Obtain an actual projection image corresponding to each of the X-ray sources, and obtain the current image reference pixel value of each of the X-ray sources according to the actual projection image corresponding to each of the X-ray sources.

The object to be measured is put into the projection area. The projection image corresponding to each of the X-ray sources is respectively acquired. The dark field template of the corresponding X-ray source is respectively subtracted from the gray value of the pixels of the projection images of each X-ray source to obtain actual projection images corresponding to each of the X-ray sources.

For the actual projection image corresponding to each of the X-ray sources, by comparing a mean value of all pixels of a column at a distance of a plurality of (e.g. 10) pixels to the left with a mean value of a column at a distance of a plurality of (e.g. 10) pixels to the right, a larger mean value of pixels is taken as the current image reference pixel value of each of the X-ray sources.

Step S2: Correct an obtained current image of each X-ray source according to the initial reference pixel value and the current image reference pixel value of each of the X-ray sources when an image is normally acquired.

When an image is normally acquired, each pixel of an image obtained after each of the X-ray sources is exposed is multiplied by a ratio of the initial reference pixel value to the current image reference pixel value of the corresponding X-ray source to obtain a group of images with consistent gray values throughout the images to effectively suppress the influence of unstable X-ray outputs on image processing, and solve the problem of inconsistent X-ray output among various X-ray sources in an X-ray image system with a plurality of X-ray sources.

Figure 7:
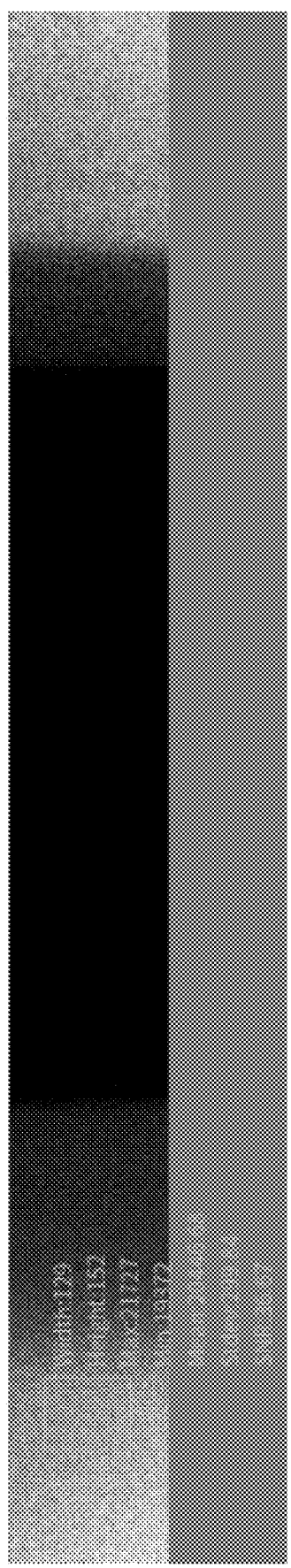
FIG. 7 and FIG. 8 show two X-ray source exposed images acquired by two X-ray detectors, respectively, prior to use of the auto exposure control system and the image calibration method provided by the present disclosure.
Figure 8:
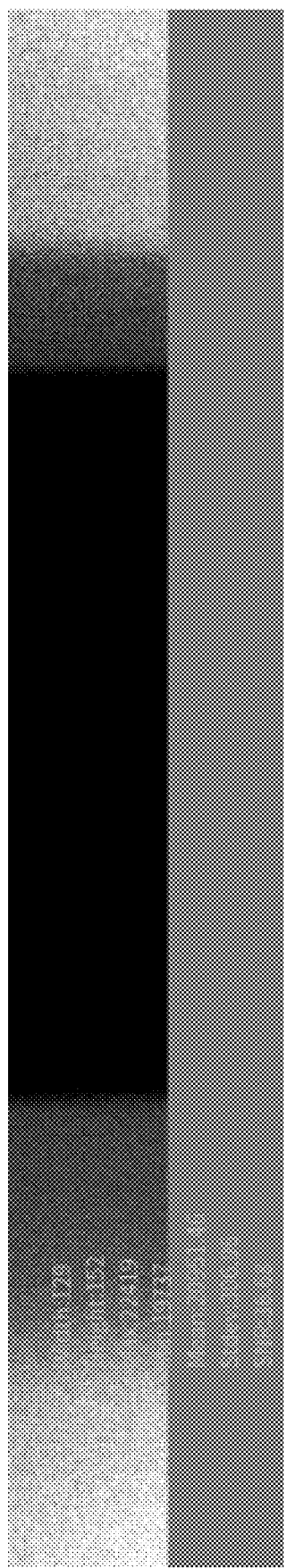

As shown in FIG. 7 and FIG. 8, before the auto exposure control system and the image calibration method are adopted, two X-ray detectors respectively acquire the images after exposure by two X-ray sources. FIG. 7 is an image after exposure by the X-ray source acquired by the first X-ray detector, and the mean gray value Mean of this image is 20446.68. FIG. 8 is an image after exposure by the X-ray source acquired by the second X-ray detector, the mean gray value Mean of this image is 20951.46, and the difference in gray value between the images of two X-ray sources is 504.78.

Figure 9:
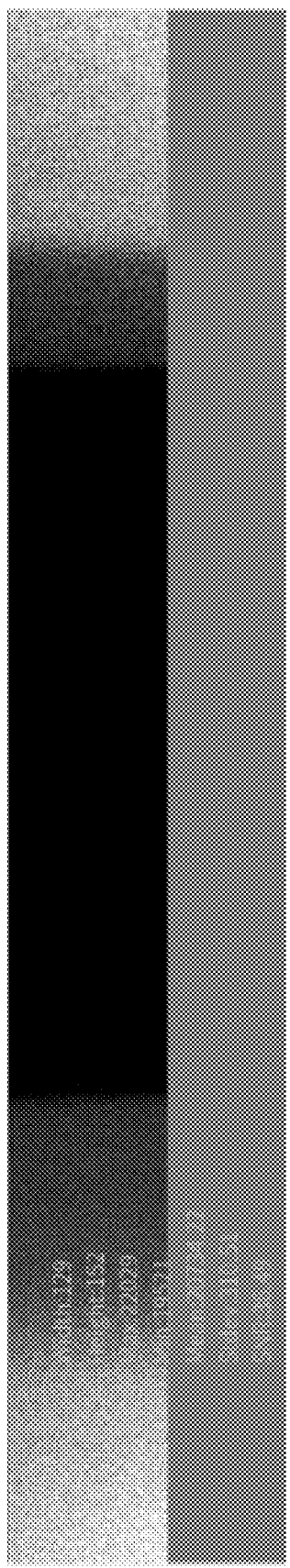
FIG. 9 and FIG. 10 show two X-ray source exposed images acquired by two X-ray detectors, respectively, after use of the auto exposure control system and the image calibration method provided by the present disclosure.
Figure 10:
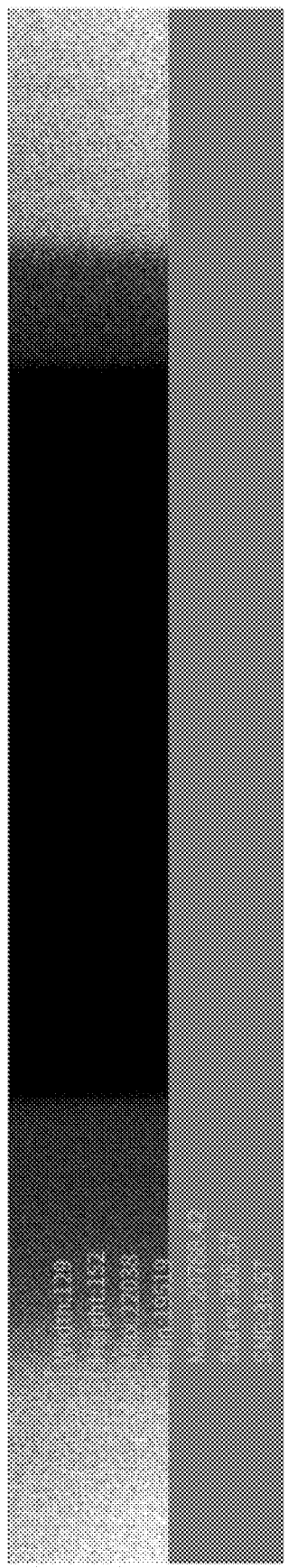

Similarly, after the auto exposure control system and the image calibration method are adopted, two X-ray detectors respectively acquire the images after exposure by the above-mentioned two X-ray sources. FIG. 9 is an image after exposure by the X-ray source acquired by the first X-ray detector, and the mean gray value Mean of the image is 20734.22, which is slightly improved with respect to the overall brightness of the image in FIG. 7. FIG. 10 shows an image after exposure by an X-ray source acquired by the second X-ray detector, the mean gray value Mean of this image is 20788.42, and the gray value difference between the images of the two X-ray sources is slightly reduced with respect to the overall brightness of the image of FIG. 2 by 54.2. It is not difficult to find that the gray difference between the images of the two X-ray sources is much reduced. Therefore, using this image calibration method can help to ameliorate the problem of inconsistent brightness of the obtained image after each X-ray source exposure.

Step S3: Obtain KV calibration template coefficients of X-rays outputted by each X-ray source.

The auto exposure unit 2 of the auto exposure control system detects each X-ray source to obtain the KV level of the X-rays outputted by each X-ray source, and normalizes the KV level of the X-rays outputted by each X-ray source to obtain the KV calibration template coefficient.

The process of obtaining the KV level of the X-rays outputted by each X-ray source is as follows. The X-ray source is detected by the auto exposure unit 2. A first energy accumulation value $I_0$ and a second energy accumulation value I of the X-rays are respectively obtained. The first energy accumulation value $I_0$ and the second energy accumulation value I of the X-rays are divided to obtain $I/I_0$, i.e. a KV level of the X-ray outputted by the X-ray source. The auto exposure unit 2 obtains the first energy accumulation value $I_0$ and the second energy accumulation value I of the X-rays the same as above.

Step S4: Perform KV calibration on the image of step S2 according to the KV calibration template coefficients of the X-rays.

The auto exposure control system detects each X-ray source, and sends the obtained KV level of the X-rays outputted by each X-ray source to an industrial control computer, so that the industrial control computer normalizes the KV level of the X-rays outputted by each X-ray source. After obtaining the KV calibration template coefficient, according to the KV calibration template coefficient of the X-rays and the air calibration template, KV calibration is performed on the image obtained after exposure of the X-ray source sent by the X-ray image detector during normal image acquisition. Specifically, when an image is normally acquired, the ratio of the pixel gray value of the image obtained after exposure of each of the X-ray sources to the pixel gray value of the air calibration template of the corresponding X-ray source is divided by the corresponding KV calibration template coefficient to perform KV calibration on the image obtained after exposure of the X-ray source to improve the image reconstruction accuracy.

The auto exposure control system and the image calibration method provided in the present disclosure have been described in detail above. For those of ordinary skill in the art, any obvious change made to the present disclosure without departing from the essential content of the present disclosure shall fall within the protection scope of the patent of the present disclosure.

What is claimed is:

1. An auto exposure control system, comprising a main control unit and a plurality of auto exposure units, the main control unit being connected to each of the auto exposure units, the auto exposure units being in cascading connection with each other via a high-speed real-time serial bus, each of the auto exposure units is installed at an outlet of a corresponding X-ray source and there is no X-ray scattering image caused by other objects to be measured, each of the auto exposure units being configured to receive an exposure signal sent by the main control unit to detect the corresponding X-ray source and obtain a KV level of X-rays outputted by the X-ray source, wherein the KV level of the X-rays is a ratio of a first energy accumulation value to a second energy accumulation value of the X-rays, and at the same time determine whether to send an auto exposure control signal to the main control unit according to a preset condition, and the main control unit adjusting an exposure time sequence according to receiving the auto exposure control signal to achieve an aim of auto exposure control.

2. The auto exposure control system according to claim 1, wherein the preset condition is: when the auto exposure unit detects the X-ray source, whether an obtained energy accumulation value of the X-rays reaches a preset energy threshold of the X-rays outputted by the X-ray source.

3. The auto exposure control system according to claim 1, wherein the main control unit adopts a time sequence control panel containing a main controller and a first transceiver, wherein the main controller is connected to the first transceiver, and the first transceiver is connected to each of the auto exposure units via the high-speed real-time serial bus.

4. The auto exposure control system according to claim 1, wherein each of the auto exposure units comprises an auto exposure control module and a processing module, wherein the auto exposure control module is connected to an output end of the main control unit on the one hand and an input end of the processing module on the other hand, and an output end of the processing module is connected to an input end of the main control unit.

5. The auto exposure control system according to claim 4, wherein the auto exposure control module comprises a first X-ray probe, a second X-ray probe, a first integration circuit, a second integration circuit and a comparison circuit, wherein an output end of the first X-ray probe and the processing module are separately connected to an input end of the first integration circuit, an output end of the second X-ray probe and the processing module are separately connected to an input end of the second integration circuit, an output end of the first integration circuit is separately connected to an input end of the comparison circuit and the processing module, and the input end and an output end of the comparison circuit and an output end of the second integration circuit are separately connected to the processing module.

6. The auto exposure control system according to claim 4, wherein the auto exposure control module comprises a first X-ray probe, a second X-ray probe, a first integration circuit, a second integration circuit and a comparison circuit, wherein an output end of the first X-ray probe and the processing module are separately connected to an input end of the first integration circuit, an output end of the second X-ray probe and the processing module are separately connected to an input end of the second integration circuit, an output end of the second integration circuit is separately connected to an input end of the comparison circuit and the processing module, and the input end and an output end of the comparison circuit and an output end of the first integration circuit are separately connected to the processing module.

7. The auto exposure control system according to claim 4, wherein the auto exposure control module comprises a first X-ray probe, a second X-ray probe, a third X-ray probe, a first integration circuit, a second integration circuit, a third integration circuit, a first subtraction circuit, a second subtraction circuit and a comparison circuit, wherein an output end of the first X-ray probe and the processing module are separately connected to an input end of the first integration circuit, an output end of the third X-ray probe and the processing module are separately connected to an input end of the third integration circuit, an output end of the second X-ray probe and the processing module are separately connected to an input end of the second integration circuit, an output end of the first integration circuit is separately connected to an input end of the first subtraction circuit and the processing module, an output end of the third integration circuit is separately connected to the input end of the first subtraction circuit and an input end of the second subtraction circuit, an output end of the second integration circuit is connected to the input end of the second subtraction circuit, an output end of the first subtraction circuit is connected to an input end of the comparison circuit, and the input end and an output end of the comparison circuit, the output end of the first subtraction circuit and an output end of the second subtraction circuit are separately connected to the processing module.

8. The auto exposure control system according to claim 4, wherein the auto exposure control module comprises a first X-ray probe, a second X-ray probe, a third X-ray probe, a first integration circuit, a second integration circuit, a third integration circuit, a first subtraction circuit, a second subtraction circuit and a comparison circuit, wherein an output end of the first X-ray probe and the processing module are separately connected to an input end of the first integration circuit, an output end of the third X-ray probe and the processing module are separately connected to an input end of the third integration circuit, an output end of the second X-ray probe and the processing module are separately connected to an input end of the second integration circuit, an output end of the first integration circuit is separately connected to an input end of the first subtraction circuit and the processing module, an output end of the third integration circuit is separately connected to the input end of the first subtraction circuit and an input end of the second subtraction circuit, an output end of the second integration circuit is connected to the input end of the second subtraction circuit, an output end of the second subtraction circuit is connected to an input end of the comparison circuit, and the input end and an output end of the comparison circuit, an output end of the first subtraction circuit and the output end of the second subtraction circuit are separately connected to the processing module.

9. The auto exposure control system according to claim 5, wherein the processing module comprises a digital-to-analogue conversion circuit, a first analogue-to-digital conversion circuit, a second analogue-to-digital conversion circuit, a processor and a second transceiver, wherein an input end of the digital-to-analogue conversion circuit is connected to the processor, an output end of the digital-to-analogue conversion circuit is connected to the input end of the comparison circuit, an input end of the first analogue-to-digital conversion circuit is connected to the output end of the first integration circuit, an input end of the second analogue- to-digital conversion circuit is connected to the output end of the second integration circuit, the output end of the comparison circuit and output ends of the first analogue-to-digital conversion circuit and the second analogue-to-digital conversion circuit are connected to the processor, the processor is connected to the second transceiver, and the second transceiver is connected to the main control unit via the high-speed real-time serial bus.

10. The auto exposure control system according to claim 7, wherein the processing module comprises a digital-to-analogue conversion circuit, a first analogue-to-digital conversion circuit, a second analogue-to-digital conversion circuit, a processor and a second transceiver, wherein an input end of the digital-to-analogue conversion circuit is connected to the processor, an output end of the digital-to-analogue conversion circuit is connected to the input end of the comparison circuit, an input end of the first analogue-to-digital conversion circuit is connected to the output end of the first subtraction circuit, an input end of the second analogue-to-digital conversion circuit is connected to the output end of the second subtraction circuit, the output end of the comparison circuit and output ends of the first analogue-to-digital conversion circuit and the second analogue-to-digital conversion circuit are connected to the processor, the processor is connected to the second transceiver, and the second transceiver is connected to the main control unit via the high-speed real-time serial bus.

\* \* \* \* \*